(12) United States Patent
Machuca Martinez et al.

(10) Patent No.: US 9,394,186 B2
(45) Date of Patent: Jul. 19, 2016

(54) PHOTO-CATALYSIS PROCESS APPLIED IN ELIMINATING RECALCITRANT COMPOUNDS IN INDUSTRIAL RESIDUAL WATERS

(75) Inventors: Fiderman Machuca Martinez, Santiago de Cali (CO); Jose Angel Colina Marquez, Santiago de Cali (CO)

(73) Assignee: UNIVERSIDAD DEL VALLE, Santiago de Cali (CO)

( * ) Notice: Subject to any disclaimer, the term of this patent is extended or adjusted under 35 U.S.C. 154(b) by 1018 days.

(21) Appl. No.: 13/508,133

(22) PCT Filed: Feb. 17, 2010

(86) PCT No.: PCT/IB2010/050710
§ 371 (c)(1),
(2), (4) Date: May 7, 2012

(87) PCT Pub. No.: WO2011/055234
PCT Pub. Date: May 12, 2011

(65) Prior Publication Data
US 2012/0223024 A1   Sep. 6, 2012

(30) Foreign Application Priority Data

Nov. 6, 2009 (CO) .......................................... 126024
Feb. 17, 2010 (WO) .................. PCT/IB2010/050710

(51) Int. Cl.
*C12Q 1/68* (2006.01)
*C02F 1/32* (2006.01)
*B01J 21/06* (2006.01)
(Continued)

(52) U.S. Cl.
CPC .................. *C02F 1/32* (2013.01); *B01J 21/063*
(2013.01); *B01J 35/004* (2013.01); *C02F 1/001*
(2013.01); *C02F 2101/306* (2013.01); *C02F 2103/30* (2013.01); *C02F 2209/06* (2013.01);
(Continued)

(58) Field of Classification Search
CPC ..................................... C02F 1/30; C02F 1/00
USPC ............ 210/748.01–748.3, 192, 243; 422/20, 422/22, 24, 28, 186, 186.3; 250/432 R
See application file for complete search history.

(56) References Cited

U.S. PATENT DOCUMENTS 4,861,484 A * 8/1989 Lichtin et al. ................. 210/638
2003/0211022 A1   11/2003 Gross
2007/0020158 A1   1/2007 Kuramoto

FOREIGN PATENT DOCUMENTS

EP  0334078   9/1989
FR  2856052   12/2004
(Continued)

OTHER PUBLICATIONS

Dijkstra, et al. "Experimental comparison of three reactor design for photocatalytic water purification" Chemical Engineering Science 56 (2001) 547-555.
(Continued)

*Primary Examiner* — Walter D Griffin
*Assistant Examiner* — Cameron J Allen
(74) *Attorney, Agent, or Firm* — Mark T. Vogelbacker; Reed Smith LLP

(57) ABSTRACT

The present invention relates to the application of a heterogeneous photocatalysis process for the treatment of industrial wastewater contaminated with recalcitrant compounds and the operating conditions of a pilot plant for implementing said process.

8 Claims, 2 Drawing Sheets

Diagram of the residual water treatment process.

(51) Int. Cl.
  *B01J 35/00* (2006.01)
  *C02F 101/30* (2006.01)
  *C02F 103/30* (2006.01)
  *C02F 1/00* (2006.01)

(52) U.S. Cl.
  CPC ....... *C02F2301/024* (2013.01); *C02F 2305/10* (2013.01); *Y02W 10/37* (2015.05)

(56) References Cited

FOREIGN PATENT DOCUMENTS

| WO | 02083570 | 10/2002 |
|----|----------|---------|
| WO | 03014030 | 2/2003 |
| WO | 2004089525 | 10/2004 |
| WO | 2005121030 | 12/2005 |

OTHER PUBLICATIONS

Malato, et al. "Photocatalysis with solar engery at a pilot-plant scale: an overview" Applied Catalysis B: Environmental 37 (2002) 1-15.

Colina-Marquez, J. et al. "Photocatalytic Mineralization of Commercial Herbicides in a Pilot-Scale Solar CPC Reactor: Photoreactor Modeling and Reaction Kinetics Constants Independent of Radiation Field" Environ. Sci. Technol. 2009 43, 8953-8960.

Mueses, M.A., et al. Degradacion fotocatalitica de acido dicloroacetico al aplicar un campo of radiacion of baja inergia. Ingenieria and Desarrollo. Jun.-Dec. 2008.

Malatos, S., et al. "Decontamination and disinfection of water by solar photocatalysis: Recent overview and trends". Catalysis Today 147 (2009) 1-59.

Colina, et al. "Photocatalytic Treatment of a Dye Polluted Industrial Effluent with a Solar Pilot-Scale CPC Reactor." J. Adv. Oxid. Technol., vol. 12, No. 1, 2009.

* cited by examiner

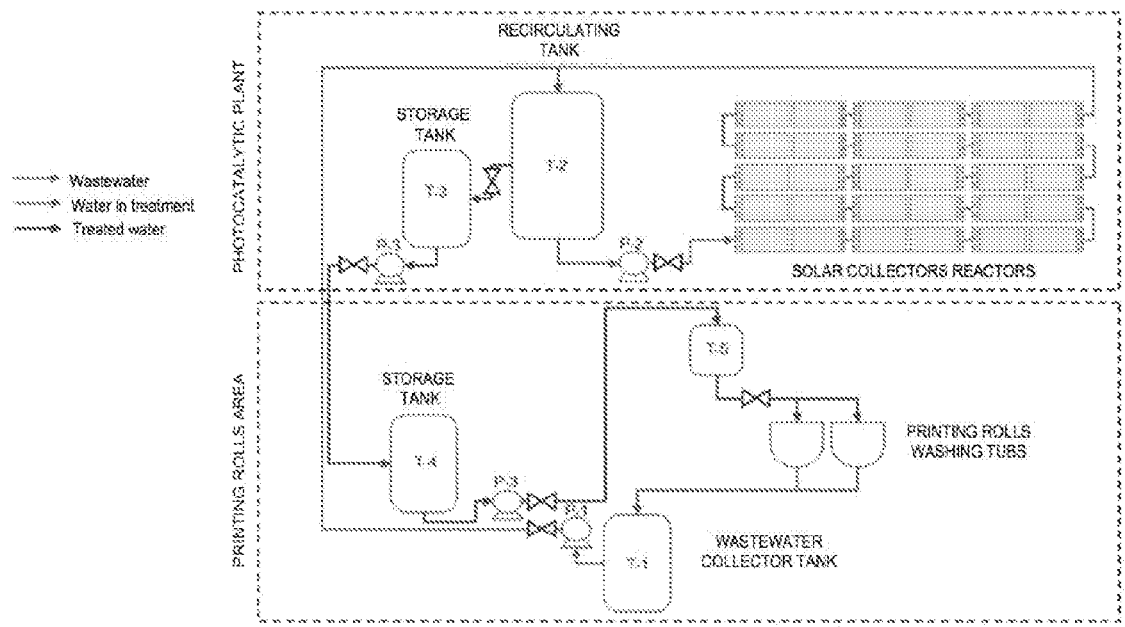
Figure 1. Diagram of the residual water treatment process.
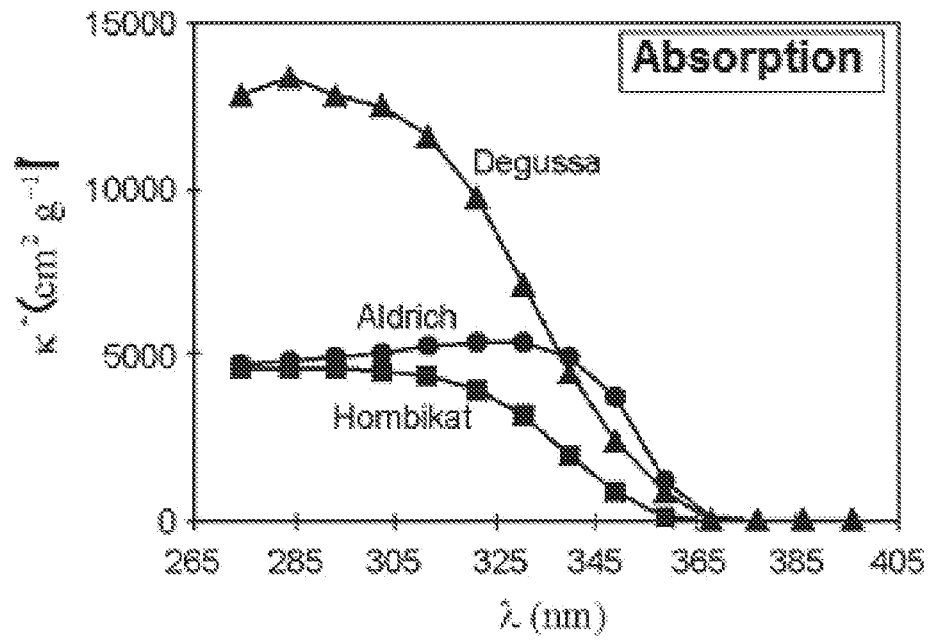
Figure 2. Absorption of different $TiO_2$ references in the UV spectrum

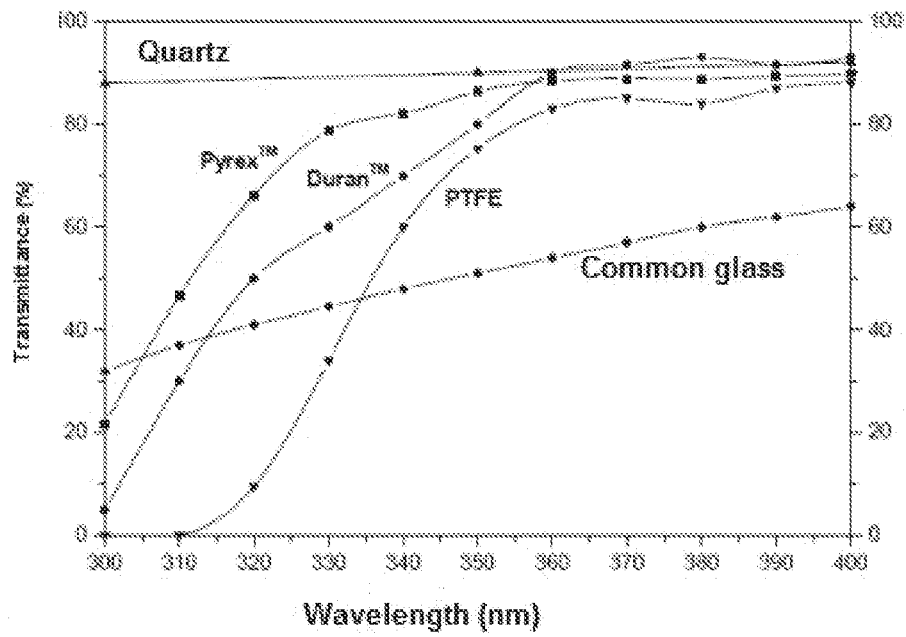
Figure 3. Transmittance of different materials
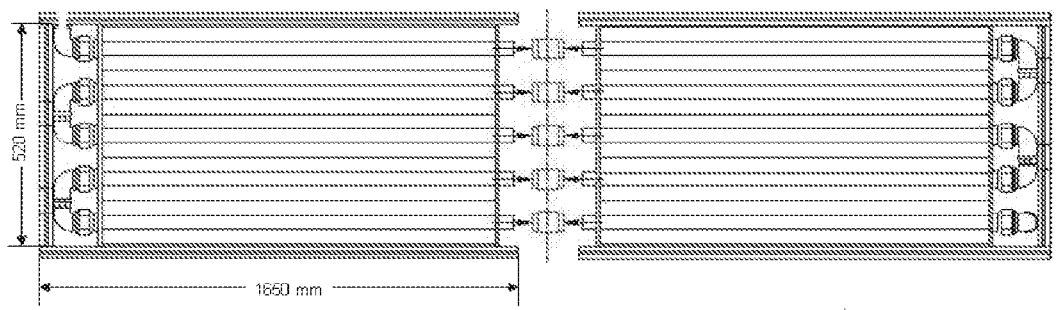
Figure 4. Main structure of the photo-reactor
Figure 5. Cross-section view of tubes and collectors of the photo-reactor.

PHOTO-CATALYSIS PROCESS APPLIED IN ELIMINATING RECALCITRANT COMPOUNDS IN INDUSTRIAL RESIDUAL WATERS

RELATED APPLICATIONS

This application is the United States National Stage of International Application No. PCT/IB2010/050710, filed Feb. 17, 2010, which was published as International Publication No. WO 2011/055234, and which claims benefit of Columbian Patent Application No. 09 126024 filed Nov. 6, 2009. Both applications are incorporated by reference in their entirety herewith.

FIELD OF THE INVENTION

The present invention is related to the application of a process of heterogeneous photo-catalysis to treat industrial residual waters, contaminated with recalcitrant compounds, and the operating conditions of a pilot plant to carry out said process.

BACKGROUND OF THE INVENTION

Photo-catalysis is a process of advanced oxidation that has been successfully used in decontaminating air and water. For decontamination of hydric resources, photo-catalytic reactors have been used at laboratory scale, but it is up to Engineering of chemical reactions to find the most suitable reactor for a given application at commercial volumes.

Prior studies have been conducted to evaluate the performance of different reactors at laboratory scale, which use artificial radiation provided by UV lamps (Dijsktra et al., 2001). However, the information is more limited regarding comparative studies of several types of reactors at pilot scale and which use solar radiation (Blanco et al., 2001).

This work is part of a more detailed study on the performance of several photo-catalytic equipments based on $TiO_2$ as catalyst. The objective of this invention is to provide a process for the design and construction of a reactor at pilot scale or industrial employing information furnished in previous works, considering all the practical aspects decidedly influencing the efficiency of the photo-catalytic process for treatment of residual waters with recalcitrant compounds.

One of the indispensable factors for developing the photo-catalytic reaction is the photonic component, without which said reaction would not be possible. In this sense, the optical properties of the photo-reactor (collectors and absorbers) and the catalyst are of utmost importance when designing these types of reactors. Another aspect to consider is the reactor's hydrodynamic performance because it must guarantee an adequate mass transfer between the contaminant substrate and the catalyst for the photo-catalysis process to be efficient.

The compound parabolic collectors (CPC) are non-concentrator high-efficiency radiation technologies for photo-chemical applications (Malato, 2004a). The present invention provides the process conditions of a pilot plant that will use a CPC as photo-catalytic reactor to eliminate recalcitrant contaminants from residual waters from a variety of industries like the printing industries that use printing inks, and the diverse agricultural industries that use pesticides.

The international document, WO2005/121030, introduces an integrated device for water decontamination and electric energy production. It consists of a hybrid photo-catalytic-photo-voltaic system comprising a photo-catalytic reactor fabricated with material transparent to visible solar radiation and using titanium dioxide, iron (II) or iron (III) as catalyst, which is superimposed to a photo-voltaic panel, both on the same support susceptible to inclination with an adequate angle to optimally avail of the incident radiation. The photo-catalytic reactor protects the photo-voltaic panel from solar ultraviolet and infrared radiation, absorbed by the photo-catalyst and the water, respectively. A recirculation pump, whose electric input is provided by the photo-voltaic panel, ensures the flow of water through the photo-catalytic reactor, which additionally cools the photo-voltaic panel. This invention is of special use for water purification in remote sites.

Request WO2004/089525 presents catalysts for photo-chemical processes with characteristics far superior in photo-catalytic performance when compared to pure titanium dioxide. The compounds are a combination of titanium dioxide with a photo-sensitive coloration capable of mediating in the photo-catalytic process by using the incident radiation in wave lengths that do not promote excitation of the pure catalyst. The photo-sensitive coloration, once excited, promotes electron transfer to the catalyst conduction band enhancing the photo-catalytic action. Treatment of waste water by using these types of compounds is capable of employing photons in a broad range of the electromagnetic spectrum.

The French request, FR2856052, shows a water-treatment plant comprising a conical tower, through its transversal section it has a duct through which a current of contaminated water is fed, then that current is deposited by gravity towards an external spiral channel in which the water current is subjected to 12 different treatments to retain materials suspended in it. The treatments are: adsorption, absorption, aerobic and anaerobic biodegradation, extraction, oxidation, and oxidation by solar photolysis and photo-catalysis or with artificial UV radiation provided by electric lamps and laser beams, and metabolite separation.

European document EP 0334078 introduces an application of the heterogeneous photo-catalysis process to clean a water current by removing an herbicide known as bentazone. Aqueous bentazone solutions at a concentration of 50 ppm are exposed to an ultraviolet radiation wave length above 340 nm. This radiation is generated from a light source with a spectral distribution simulating solar radiation; titanium dioxide is used as catalyst.

Request WO 03014030 introduces an apparatus for water disinfection and a method to inactivate or destroy microorganisms and organic matter present in water. The treatment method consists of adding hydrogen peroxide to contaminated water, introducing the water with peroxide into the photo-catalytic reactor, which has a porous bed, then air is injected into the reactor and UV radiation is provided inside it.

Document WO 02083570 presents a method and an apparatus for photo-voltaic purification of water. Water with organic and inorganic contaminants is fed onto a permeable, open-cell semiconducting unit. Within the unit, a semiconducting surface is capable of acting as a promoter of electronically active sites when exposed to a light source. The catalyst used is titanium dioxide.

The United States request, US2003211022, indicates a device to treat and decontaminate water containing organic agents or biological agents like viruses and bacteria. The device uses an inert substrate to support a photo-active catalyst, which can be titanium dioxide; some high-energy radiation (especially UV) transmission media are also included. The matrix presents a large surface, which is in direct contact with the contaminated water. Radiation that can be provided by a UV lamp is transmitted through the substrate. The substrate introduces media to interact with the photo-active catalyst and organic matter in the water. The photo-active catalyst accelerates decomposition of organic matter present in the water.

Document US2007020158 reveals a system and procedure to treat contaminated water through a photo-catalytic process. The system is comprised of a reservoir in which organic and inorganic contaminants present in water are decomposed. The system includes a recirculation subsystem with a main unit, input pipes connected to the main unit, output pipes connected to the main unit, a pump to recirculate the water, a filter inside the main unit, photo-catalytic processing media placed after the filter and which include a catalyst transporter, and a UV lamp. There is also an electrode unit inside the contaminated water reservoir, with which the water is electrolyzed.

Although patent literature reveals that different devices or reactors have been used to carry out said treatment by employing artificial UV sources (electric lamps) or through solar radiation and that as a general rule, titanium dioxide in anatase crystalline structure is as catalyst; however, there is need to improve processes and equipment for treatment of water contaminated with recalcitrant substances.

BRIEF DESCRIPTION OF THE FIGURES

FIG. 1 presents a general scheme of the residual water treatment process of the present invention.

FIG. 2 shows the absorption of different $TiO_2$ references in the UV spectrum.

FIG. 3 presents the transmittance of different materials.

FIG. 4 the main structure of the photo-reactor.

FIG. 5 presents a cross cut of the tubes and collectors of the photo-reactor.

OBJECTS OF THE INVENTION

The object of the invention is related to a photo-catalytic process used in purifying residual waters contaminated with recalcitrant compounds.

DETAILED DESCRIPTION OF THE INVENTION

This invention seeks to use a photo-catalytic process to treat residual waters contaminated with recalcitrant materials to reduce their contamination levels.

Photo-catalytic technologies are quite varied and their use depends on the final objective of the treatment, as well as on the radiation source, and the catalyst being used. In photo-catalytic treatment systems, the alternatives are reduced to heterogeneous and homogeneous photo-catalysis. Laboratory-scale results have shown that homogeneous photo-catalysis, denominated Photo-Fenton and which uses iron in +3 oxidation state as catalyst, is more rapid in destroying most contaminants subjected to photo-catalytic oxidation processes. Heterogeneous photo-catalysis, although slower, can use oxygen dissolved in water as electron acceptor and work very efficiently at natural pH or near neutrality. In homogeneous photo-catalysis, the working pH is acidic (near 3) and needs a constant dose of hydrogen peroxide to generate the hydroxyl oxidant species.

The heterogeneous catalysts used in the present process are photo-sensitive semiconductor materials like ZnO and $TiO_2$ in their anatase crystalline structure. These materials have the property of permitting their electrons from the valence band to pass to the conduction band with the supply of energy from photons belonging to a certain range of the light spectrum. Commercial-grade $TiO_2$ (Degussa P-25) with a 75% anatase and 25% rutile crystalline structure is the most commonly used catalyst for heterogeneous photo-catalysis, due to its low cost and availability, in addition to presenting better optical and physical properties for photo-chemical reactions. Also, it is a harmless substance for the human organism, which can be reused several times without losing its catalytic activity. The subsequent separation of this catalyst, once the photo-catalytic treatment is completed, is carried out via microfiltration or decantation.

The pilot plant will use solar radiation as a source of photons to promote the oxidation photo-catalytic reactions, the catalyst will be the Degussa P-25, and the test contaminant matrix can be a mix of industrial tint residues or residues from pesticides used in agro-industry. The photo-catalysis process will take place by recirculating a sole contaminated lot through the system for a period of time to be determined by the quality and availability of solar radiation.

FIG. 1 shows the diagram of the photo-catalytic process applied in treating industrial residual waters contaminated with recalcitrant compounds, in this case, flexographic tint residues for example. Water from washing the rollers is contaminated with the ink residues present the print rollers. Drainage from this water flow is collected in the T-1 tank. When enough volume has been collected in this tank, it is transported to the T-2 recirculation tank by using the P-1 pump, and diluted in this tank with water a ratio of 4:1. The first dilution of the process is made with fresh water; thereafter, treated water will be used. Once the tank is full, the catalyst is added for the first and only time (this same catalyst will be reused in the subsequent treatments, which will be removed when it has lost its activity). The P-2 pump will be in charge of recirculating the catalyst and tinted water suspension through the collector system. As previously mentioned, the process has an intermediate duration because it depends on the availability of solar radiation. The process will be suspended under the following conditions: elimination of the color of the residual effluent, adverse weather conditions (rain), or if the sun has set. In case the color has been eliminated from the residual effluent, the next step will be to let the catalyst decant to be able to separate the clear supernatant. This process lasts between 12 and 24 hours, depending on the amount of treated water to be reused to wash the rollers. Between 10% and 25% of the treated water from the T-2 recirculation tank will be transferred by gravity to the T-3 storage tank. When this tank has sufficient volume (70-80% of the total), the water will be pumped via P-3 to the T-4 secondary storage tank. Finally, according to plant requirement, it will be pumped via the P-4 pump to the T-5 tank used to provide water to wash the rollers; thus, closing the treatment cycle.

Additionally, another object of the present invention is the treatment plant where the water photo-catalytic treatment of the present invention is carried out. The core of the treatment plant is the collector system. Collectors can be of two types: concentrator and non-concentrator. Concentrator technologies can radiate a greater amount of light energy within the photo-catalytic reactor, but for solar radiation the diffuse fraction is wasted. Although for thermal applications this does not pose any inconvenience, for reactors using $TiO_2$ as catalyst, which is photo-sensitive only in the UV range, this would be a notable disadvantage because a good part of the UV energy would be wasted in the diffuse fraction of solar radiation; all this without considering the higher costs of materials to construct the reactor (E.g., quartz) and mechanisms for solar trajectory monitoring. The non-concentrator technologies are more efficient in availing of the direct and diffuse solar radiation components.

The optical properties of the material employed for the construction of the photo-reactor must be kept in mind to guarantee the maximum efficiency of the photo-catalytic system. Among the aspects that should be considered is that the material must allow passage of photons that promote photo-catalytic reaction, i.e., it must have high transmittance in the wave length range in which the catalyst is photo-sensitive (FIG. 2); for Degussa P-25 this range lies between 200 and 390 nm (corresponding to the UV radiation range). Regarding the transmittance of the different materials for the photo-reactor (FIG. 3), although the best transmittance is presented by quartz, for commercial applications it is quite expensive; the most viable option, then, would be low-iron content glass, like Pyrex® or Duran®.

The main panel of the photo-reactor comprises 10 tubes placed in five rows over the compound parabolic collectors (FIG. 4). The diameter selected for the glass tubes (SCHOTT Duran®) is of 32 mm and the tubes are 1.4 mm thick, what is commercially available. The tubes were cut from their original length of 1.5 m to 1.2 m, given that the sheets to construct the collectors are this length. Tube diameter is between 25 and 50 mm, given that diameters smaller than 25 mm are not feasible because of the great loss of pressure in the turbulent regime, while diameters above 50 mm present absorption problems of the catalyst in suspension, keeping the radiation from reaching the innermost zone of the reactor. The collectors were constructed in high-reflectivity aluminum (80-90%), which is also weather resistant. The curves were molded with a folding machine based on numerical control (FIG. 5). The support structure was constructed with galvanized zinc sheets, as well as the guides supporting the collectors and glass tubes. The joints between tubes are anti-slip PVC joints, which can permit torsion without affecting the glass tube during maintenance processes.

The flow regime is another very important variable for the purpose of designing the pilot plant and the scaling process. This requires a hydraulic calculation of the system to determine the theoretical power of the pump, which must guarantee the turbulent regime of the flow through the photo-reactor. The Reynolds number must be equal to or above 15,000, for which the flow through the glass tubes must be above 24 l/min (for a 32-mm tube diameter). With this flow there will be no sedimentation of the catalyst at the bottom of the tubes, for which the mass transference on its surface will be more effective, and the efficiency of the photo-chemical reaction will not be affected.

The following presents an example of the best performance of the present invention.

The plant assembly was carried out on the terrace in the School of Chemical Engineering at Universidad del Valle, which sought to take advantage of the great availability of radiation in that zone. The construction of the system was done with PVC pipes and accessories. The flow meter has a maximum limit of 25 gpm (95 l/min), which allows measuring the flow through the system without inconvenience. In a first hydraulic test, we obtained a flow of 8.1 gpm (30 l/min). The glass tubes supported the pressure of the circulating liquid without problems. Thereafter, we conducted exploratory tests with industrial tints to monitor color. The mix of residues was diluted with tap water in a ratio of 8:1. We added 15 g of the P-25 catalyst with which the catalyst concentration reached 0.5 g/l, given that the total volume treated was 30 liters. After 4 hours of continuous treatment, discoloration obtained was at 100% and a reduction of the total organic carbon of 33%, with a total of 490 kJ/m² of UV energy measured. It should be mentioned that the weather conditions for this experiment were not the best as far as solar radiation is concerned, because during most of the experiment, the sky was partially overcast. These preliminary results agree with those obtained in literature referring to heterogeneous photo-catalysis as a mechanism to eliminate contaminants coming from paper and textile industries where coloring agents and tints are very serious environmental problems.

Although the present invention has been described with the preferred embodiments shown, it remains understood that the modifications and variations that preserve the spirit and scope of this invention are understood within the scope of the attached claims.

The invention claimed is:

1. A photo-catalysis process for decontamination of waters contaminated with recalcitrant substances comprising:
    a) transporting residual water contaminated with recalcitrant substances to a recirculation tank;
    b) adding a catalyst composed of 75% anatase and 25% rutile to said recirculation tank;
    c) transporting the residual contaminated water and catalyst from the recirculation tank to a collector system;
    d) recirculating the residual contaminated water through the collector system until the recalcitrant substances are decreased as measured by reduction of chemical oxygen demand (COD) of the residual contaminated water to 25 to 35% of its starting value to yield residual decontaminated water;
    e) sedimenting the catalyst from the residual decontaminated water contained in said recirculation tank to yield residual decontaminated water without catalyst; and
    f) transporting a portion of the residual decontaminated water without catalyst from the recirculation tank to a storage tank.

2. The photo-catalysis process for decontamination of waters contaminated with recalcitrant substances from claim 1, wherein the recalcitrant substances come from textile, printing, and/or agro-chemical industries.

3. The photo-catalysis process for decontamination of waters contaminated with recalcitrant substances from claim 1, wherein a Reynolds number in the collector system is above 15,000.

4. The photo-catalysis process for decontamination of waters contaminated with recalcitrant substances from claim 1, wherein a flow rate of the residual contaminated water in the collector system can vary from 15 l/min to 50 l/min.

5. The photo-catalysis process for decontamination of waters contaminated with recalcitrant substances from claim 1, wherein the catalyst concentration is between 0.2 and 0.8 g/l in the collector system.

6. The photo-catalysis process for decontamination of waters contaminated with recalcitrant substances from claim 1, wherein the collector system comprises a collector made of borosilicate glass with an iron content under 100 ppm.

7. The photo-catalysis process for decontamination of waters contaminated with recalcitrant substances from claim 1, wherein a time of residence in darkness for the residual contaminated water to remain with the catalyst is of 30 minutes.

8. The photo-catalysis process for decontamination of waters contaminated with recalcitrant substances from claim 1, wherein an initial pH of the residual contaminated water varies between 3 and 9.0.

* * * * *